July 28, 1936.  C. S. LARSON ET AL  2,048,938
ELEVATOR FOR CONVEYER SYSTEMS
Filed Aug. 3, 1935  9 Sheets-Sheet 3
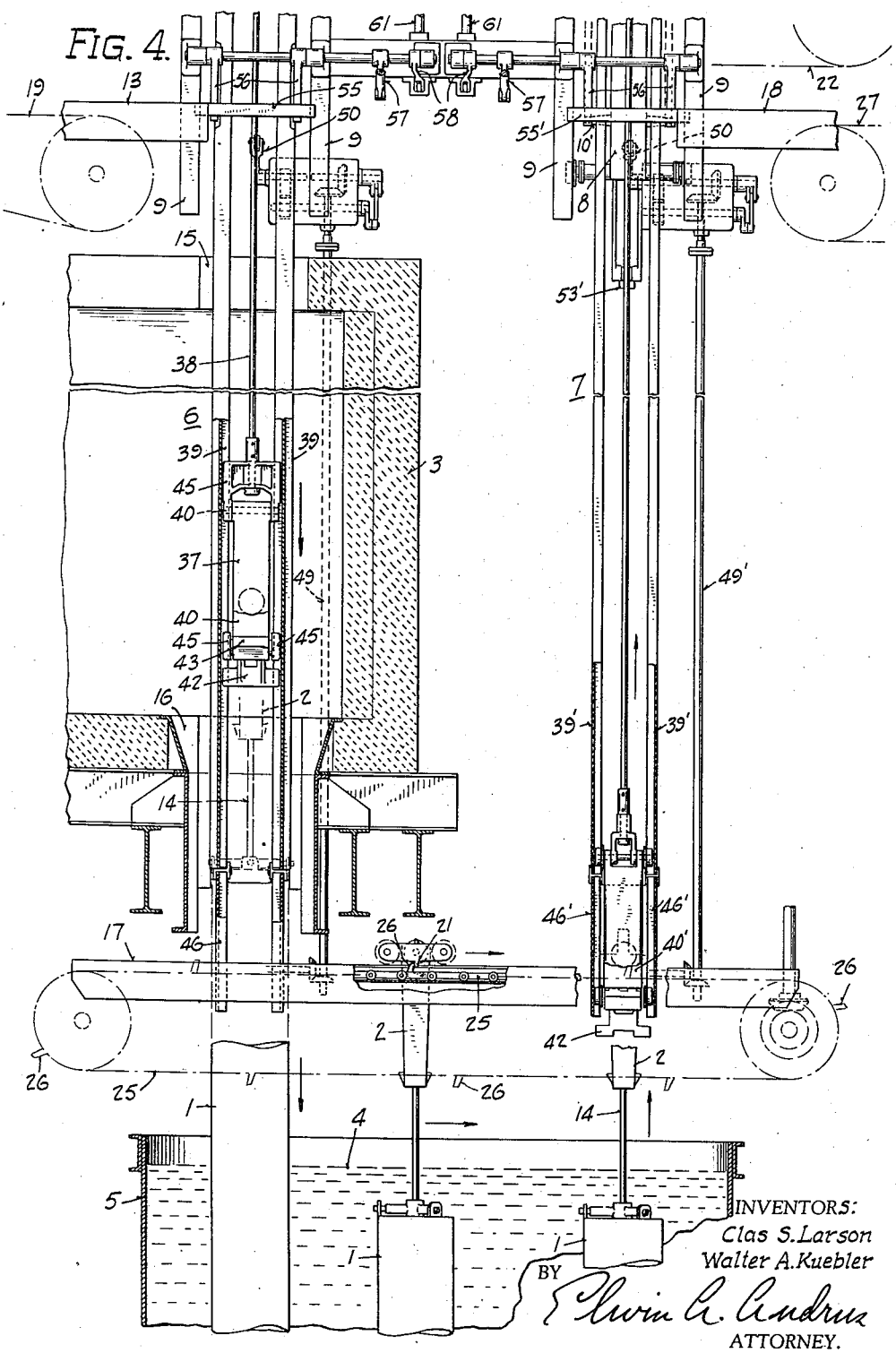
FIG. 4.
INVENTORS:
Clas S. Larson
Walter A. Kuebler
BY
ATTORNEY.

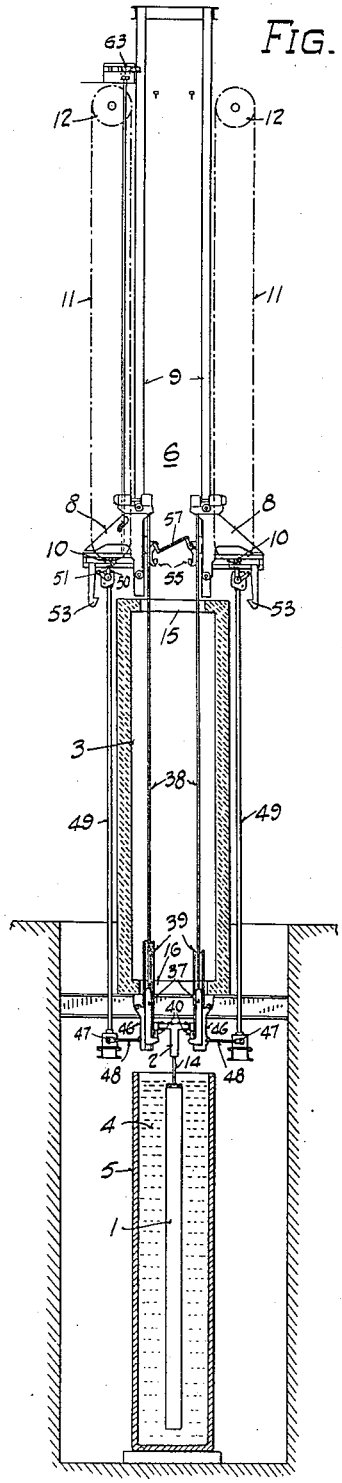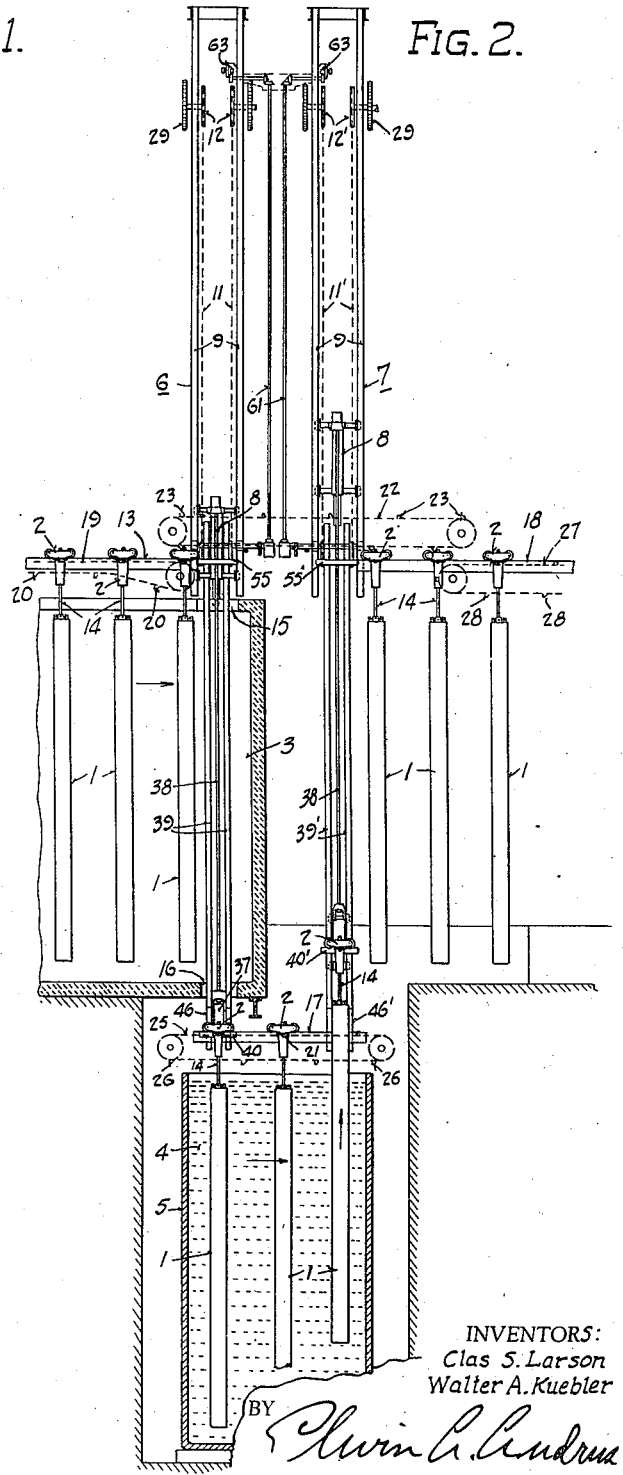

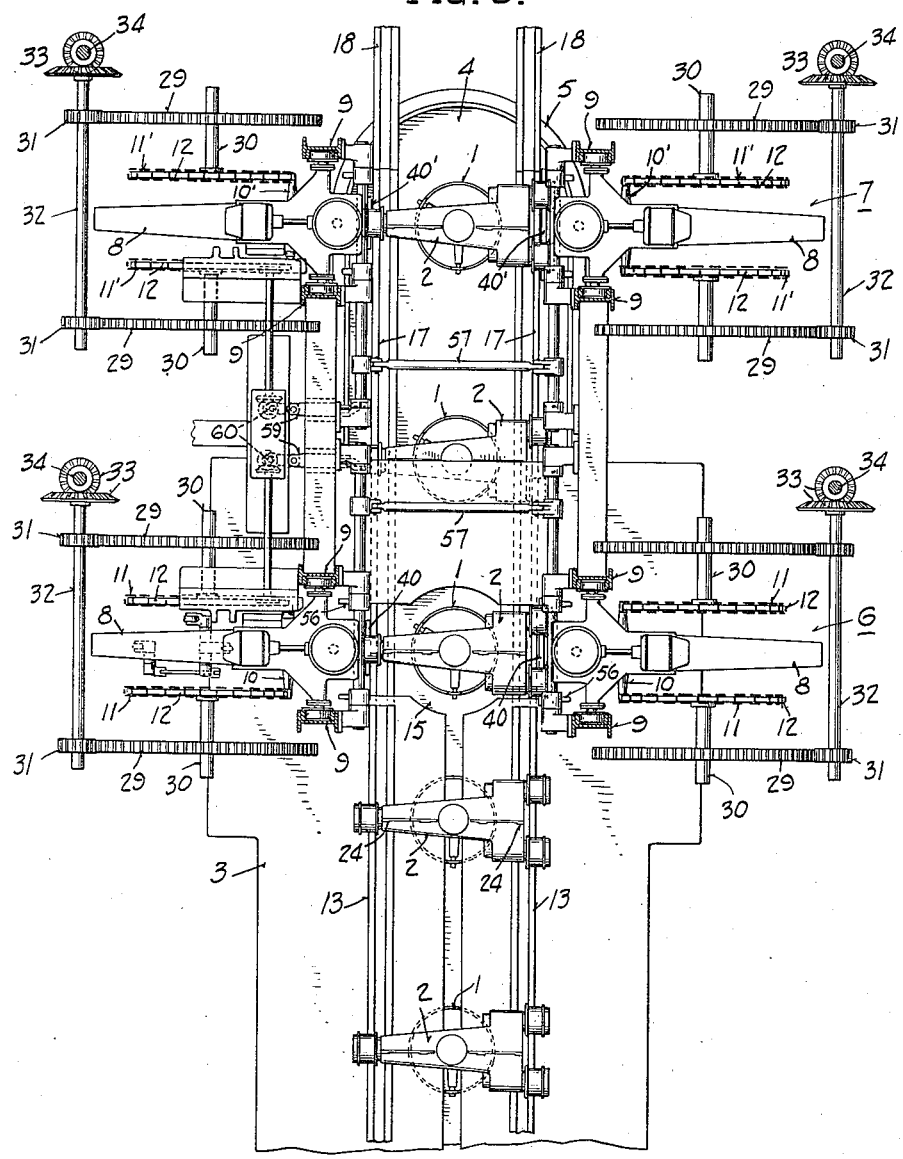

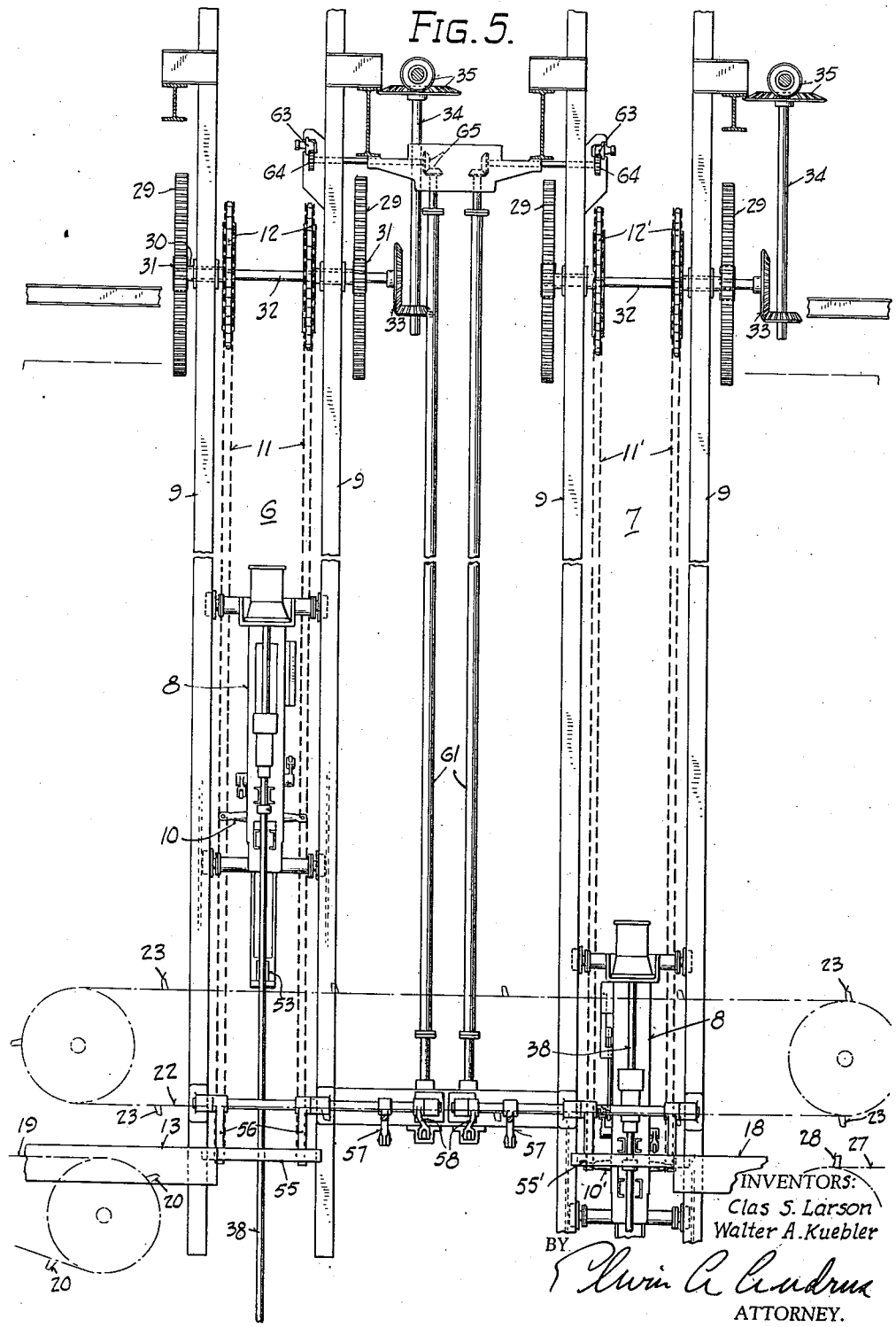

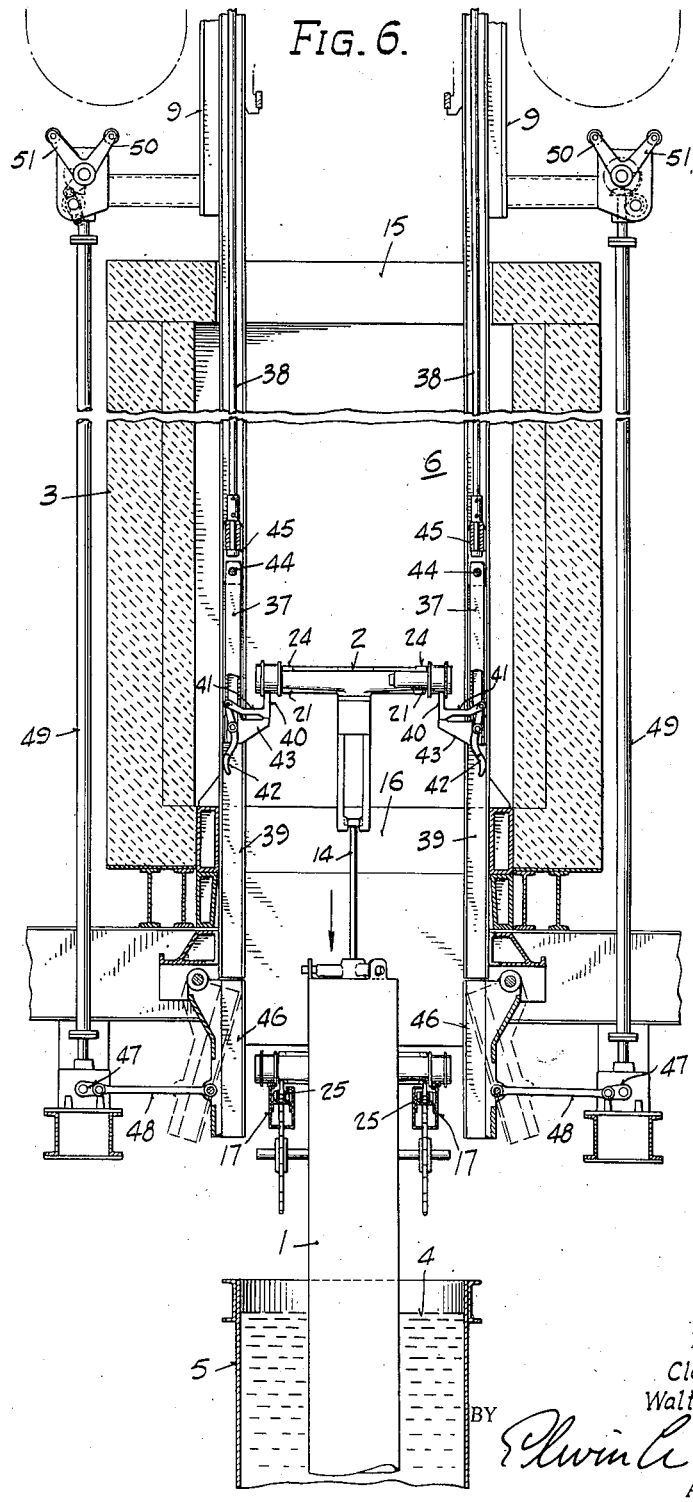

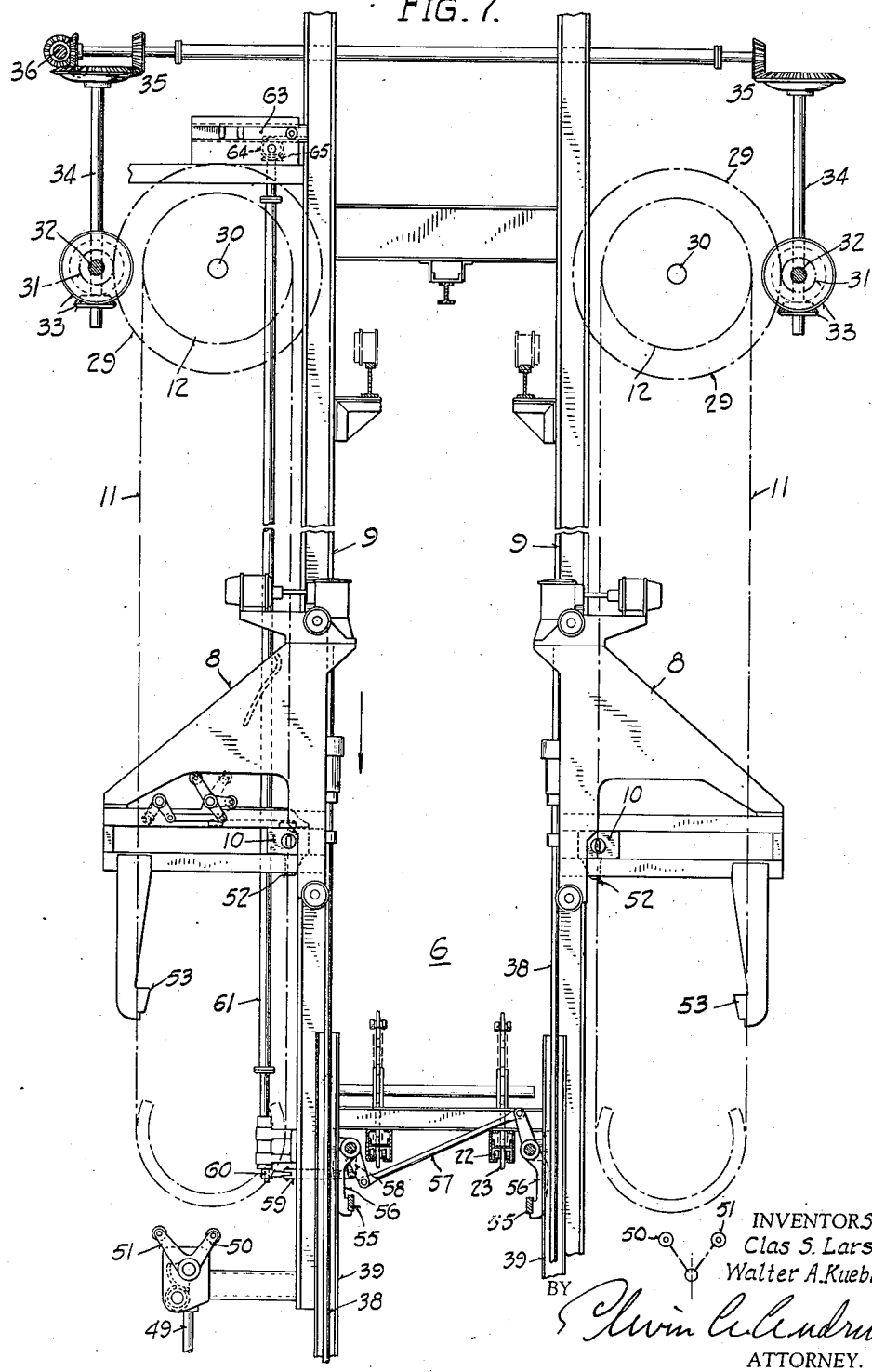

July 28, 1936.  C. S. LARSON ET AL  2,048,938
ELEVATOR FOR CONVEYER SYSTEMS
Filed Aug. 3, 1935  9 Sheets-Sheet 7
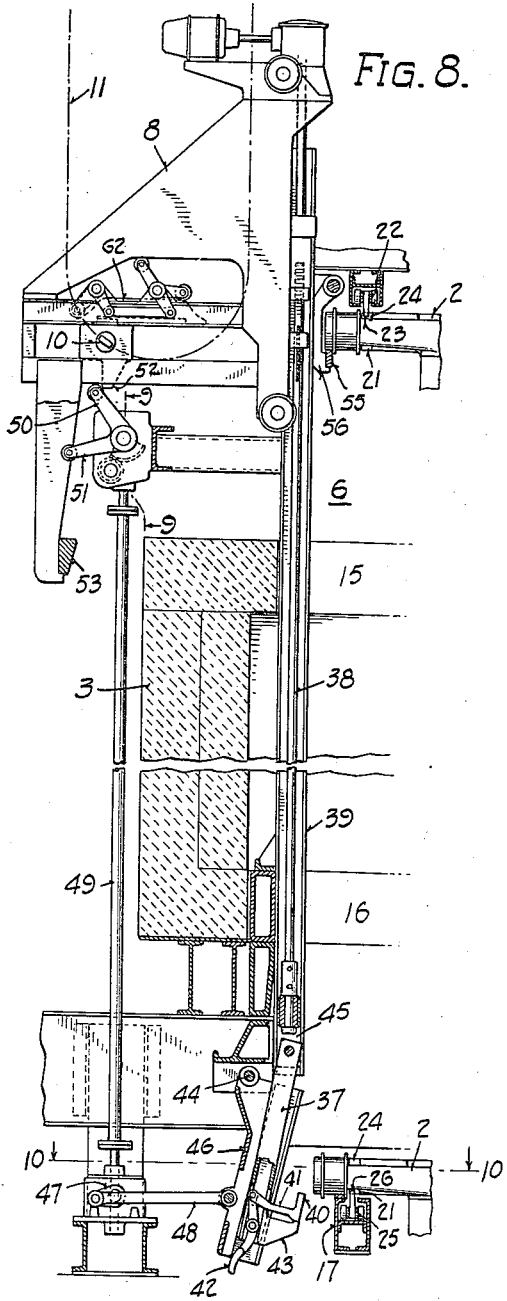
Fig. 9.
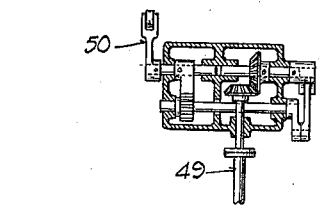
Fig. 10.
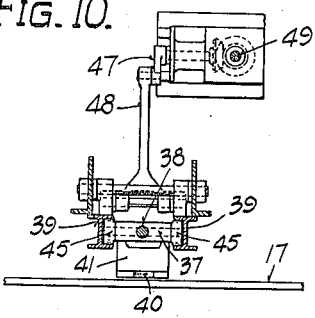
Fig. 11.
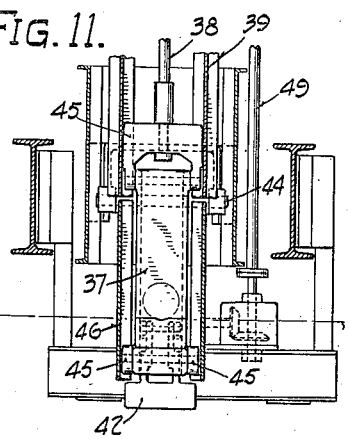
INVENTORS:
Clas S. Larson
Walter A. Kuebler
BY
ATTORNEY.

July 28, 1936.  C. S. LARSON ET AL  2,048,938
ELEVATOR FOR CONVEYER SYSTEMS
Filed Aug. 3, 1935   9 Sheets-Sheet 8

INVENTORS:
Clas S. Larson
Walter A. Kuebler
BY
ATTORNEY.

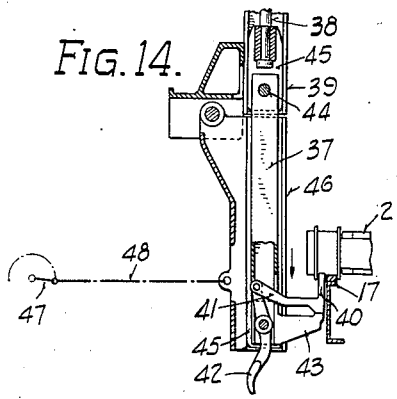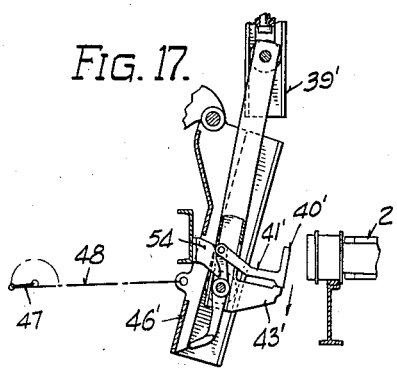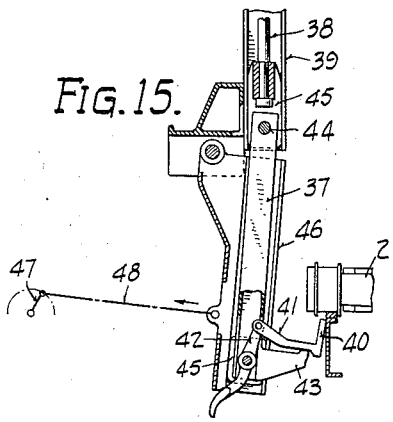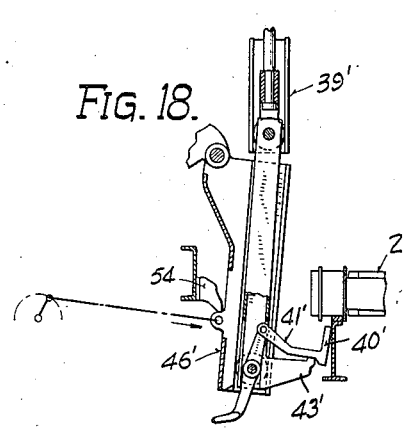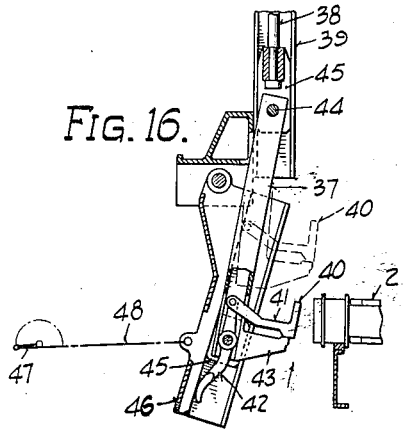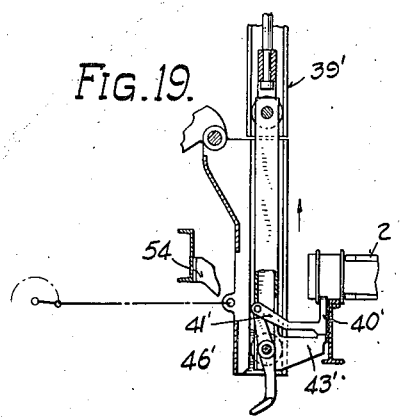

Patented July 28, 1936

2,048,938

UNITED STATES PATENT OFFICE 2,048,938

ELEVATOR FOR CONVEYER SYSTEMS

Clas S. Larson and Walter A. Kuebler, Milwaukee, Wis., assignors to A. O. Smith Corporation, Milwaukee, Wis., a corporation of New York Application August 3, 1935, Serial No. 34,512

7 Claims. (Cl. 104—128)

This invention relates to an elevator for conveyer systems. This application is related in general to the copending application of C. S. Larson and Walter A. Kuebler, Serial No. 34,513, for Apparatus for enameling articles, filed August 3, 1935, and the application of Walter A. Kuebler, Serial No. 34,511, for Elevator for conveyer trucks, filed August 3, 1935.

The object of the invention is to provide a more simple, efficient and economic structure for transferring an article or conveyer truck from one conveyer level to another.

Other objects will appear hereinafter.

The invention is illustrated in the accompanying drawings in which:

Figure 1 is a vertical section of the conveyer system showing the elevator in side elevation;

Fig. 2 is a side elevation of two elevators and the conveyer system taken at right angles to Figure 1;

Fig. 3 is a top plan view of the elevators of Fig. 2;

Fig. 4 is an enlarged detail side elevation of the mechanism shown in the lower portion of Fig. 2 with the elevators in different position;

Fig. 5 is an enlarged detail side elevation of the mechanism shown in the upper portion of Fig. 2, complementary to Fig. 3;

Fig. 6 is an enlarged detail view of the mechanism shown in the lower portion of Figure 1 with the quenching tank broken away and the elevator on its way down;

Fig. 7 is an enlarged detail view of the mechanism shown in the upper portion of Fig. 1 complementary to Fig. 6;

Fig. 8 is a detail view of Fig. 6 and Fig. 7 combined showing the elevator starting up empty;

Fig. 9 is a section on line 9—9 of Fig. 8 showing the upper trip operating mechanism in a different position;

Fig. 10 is a horizontal section on line 10—10 of Fig. 8 showing the lower trip operating mechanism corresponding to the position of Fig. 9;

Fig. 11 is a side elevation of the mechanism shown in the lower portion of Fig. 8 taken at right angles to Fig. 8;

Fig. 14 is a detail view showing the position of the elevator rails of the lowering elevator as it moves downwardly and reaches the bottom of its stroke loaded;

Fig. 15 is a similar view to Fig. 13 taken at the bottom of the elevator movement showing the removal of the rail from engagement with the truck wheel;

Fig. 16 is a view similar to Figs. 14 and 15 showing successive positions of the elevator rail as the elevator starts upwardly empty;

Fig. 17 is a similar detail view showing the lifting elevator rails as they approach the bottom end of the elevator movement empty;

Fig. 18 is a view similar to Fig. 17 showing the operation of the trip mechanism in inserting the elevator rail beneath the truck wheels; and Fig. 19 is a view similar to Figs. 17 and 18 showing the elevator rails starting upwardly loaded.

Figure 12:
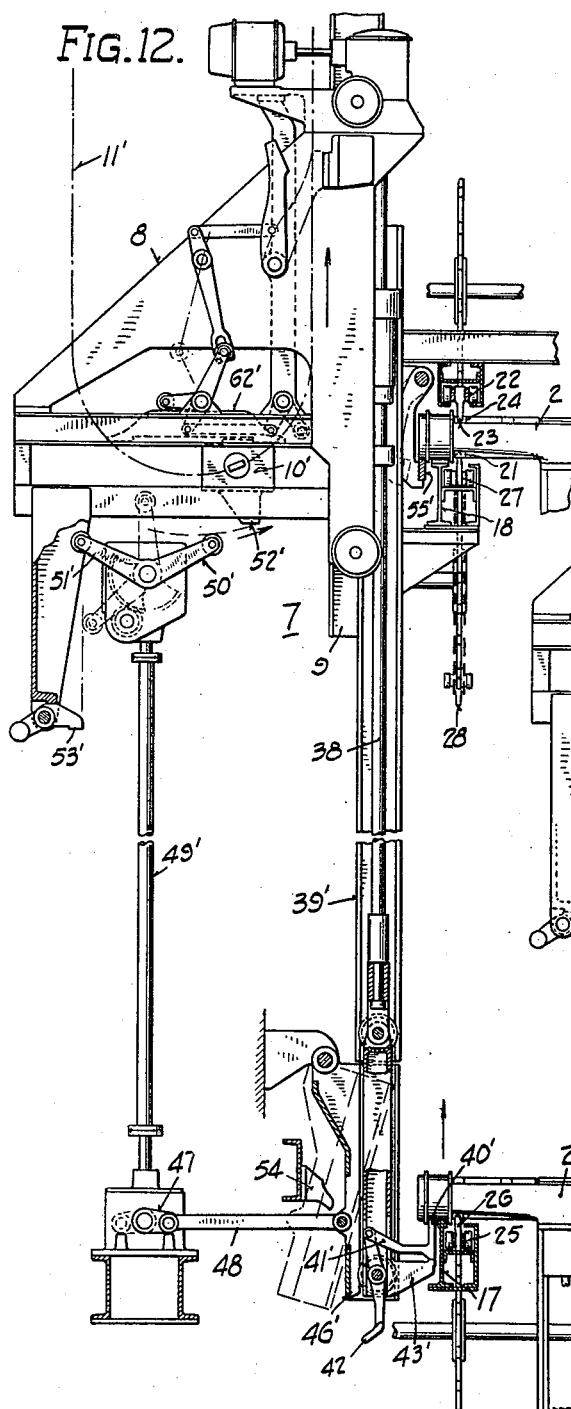
Fig. 12 is a view similar to Fig. 8, but of the lifting elevator shown at the right hand side of Fig. 2.

The invention, as illustrated, has been applied in a plant for the enameling of large sections of pipe 1 for underground pipe lines. The pipe sections are of the order of 40 feet in length and in some instances weigh as much as two tons apiece. In the enameling of the pipe, as more specifically disclosed in the copending applications above referred to, the pipe 1 is loaded onto a conveyer truck 2 from which it is conveniently suspended. It then passes through a spray booth where it is uniformly coated with vitreous enameling material. From there it passes through a drying chamber and then is lowered into a furnace 3 where the enameling material is fused at about 1700° F. The pipe is then lowered through the floor of the furnace 3 directly into a quenching bath 4 maintained in a tank 5. The pipe is moved laterally a short distance in the tank 5 and is then lifted out to another conveyer level.

The present invention relates to two of the elevators employed, namely, the elevator 6 for lowering the pipe section from the furnace into the quenching tank, and the elevator 7 for lifting the pipe out of the quenching tank.

Each elevator comprises two separate carriages 8 operating in channel guide members 9 which constitute part of the frame work for the system. Each carriage 8 is supported on a crosshead 10 between two parallel endless chains 11 operating on upper sprockets 12. The path of the chains 11 has the same height as the movement of the elevator carriage 8, and the chains are driven by the same motor as drives the conveyer system, this construction being in accordance with that described in the copending application Serial No. 34,513, referred to above.

The trucks 2 run on tracks 13 above the furnace, with the hangers 14 passing through a slot in the roof of the furnace 3 and suspending the pipe sections 1 in the furnace. As the trucks come to elevator 6 they are lowered through the opening 15 in the roof of the furnace 3, through the furnace chamber and finally through the opening 16 in the floor of the furnace onto the tracks 17 disposed horizontally above the quenching tank 5. The trucks then move horizontally on tracks 17 to elevator 7 where they are picked up and raised to a level with the tracks 18. The trucks then move on tracks 18 to the unloading station, not shown, or to a third elevator which transfers them to a higher level where they pass to the unloading station. The operation of the trucks is continuous throughout the system as described in detail in copending application Serial No. 34,513, above referred to, and in the part of the system here illustrated, the trucks are always loaded, one pipe section being suspended from each truck, and the trucks moving along the system successively and continuously.

The movement of the trucks 2 on tracks 13 is effected by means of an endless chain 19 running parallel to and below the tracks and having means 20 thereon for engaging lugs 21 on the under surface of the truck body. The trucks 2 are moved from tracks 13 into elevator 6 by means of an endless chain 22 running parallel to and above the tracks 13 and having means 23 thereon for engaging lugs 24 on the upper surface of the truck body. The trucks 2 are transferred from elevator 6 to elevator 7 on tracks 17 by means of an endless chain 25 running parallel to and below the tracks and having means 26 thereon for engaging the lugs 21. The trucks 2 are transferred from elevator 7 onto tracks 18 by means of the endless chain 22 which extends parallel to and above the tracks 18 and the means 23 thereon engaging the lugs 24. The trucks 2 are then moved along tracks 18 by means of an endless chain 27 running parallel to and below the tracks and having means 28 thereon for engaging lugs 21.

By driving the several chains 19, 22, 25, and 27, as well as the elevators 6 and 7 from the same motor, absolute synchronism in operation is obtained and there is no danger of dropping one of the heavy pipe sections which might normally cause a great deal of damage. For this purpose, the upper elevator sprockets 12 are driven by gears 29 on the sprocket shaft 30 through pinions 31, horizontal shaft 32, bevel gears 33, vertical shaft 34, bevel gears 35, and horizontal shaft 36 connected to the motor, not shown. The several horizontal conveyer chains are similarly driven by gearing and shafts connecting their respective sprockets with the drive motor.

In the elevator 6, hangers 37 are suspended from the carriages 8 by means of depending rods 38, the hangers 37 comprising in effect a crosshead sliding up and down between vertical channel sections 39. The hangers 37 support rail sections 40 on arms 41 pivoted to cam levers 42 on the hangers and supported by projections 43 fixed to the lower end of the hangers. The rail sections 40 are locked in position during vertical movement of the hangers 37 by means of the cam levers 42 riding in the channels 39.

The hangers 37 are pivoted at 44 at the lower end of rods 38 and have rollers or shoes 45 riding in the channels 39. Each hanger 37 has an upper pair and a lower pair of rollers or shoes 45. The upper pair of rollers or shoes 45 never leave the channels 39, but the lower pair of rollers or shoes 45, as they reach the lower end of channels 39, enter an auxilary channel member 46 which is pivotally suspended so as to permit it to swing laterally away from the elevator and thereby swing the lower end of the hanger 37 outwardly to remove the rail 40 from beneath the wheel of the truck 2.

The movement of the member 46 is illustrated in Figs. 14 to 16. In Fig. 14 the hanger 37 has reached the bottom of its movement and has placed a truck 2 upon the tracks 17. The member 46 is then pivoted laterally away from the elevator to remove the rail 40 from beneath the wheel of the truck as shown in Fig. 15. In this operation, the rail 40 engages the flange on the truck wheel and is pulled off from the support 43, permitting the rail to drop beneath the flange and continue its lateral movement to the position shown in Fig. 16 where the hanger 37 is shown starting upward. As the rail 40 clears the wheel of truck 2, the lower end of hanger 37 swings inwardly in line with channels 39 and the cam lever 42 moves the rail 40 back onto the fixed support 43 where it remains until it again lowers to place a truck onto track 17.

The operation of member 46 is effected by a crank 47 and link 48. The crank 47 is turned by suitable bevel gearing from vertical shaft 49 which in turn is rotated by means of cranks 50 and 51 through suitable gearing at the top of the shaft, see Figs. 8 to 10. Crank 50 is positioned to be engaged by the cam block 52 on crosshead 10, as the same moves away from the elevator shaft, to turn the shaft 49 and effect swinging of member 46 outwardly to release the rail 40. Crank 51 is disposed in the path of a cam block 53 fixed to the carriage 8 so that as the latter moves upwardly, the shaft 49 is turned in the opposite direction, effecting a swinging of member 46 back into alignment with the channels 39.

Figure 13:
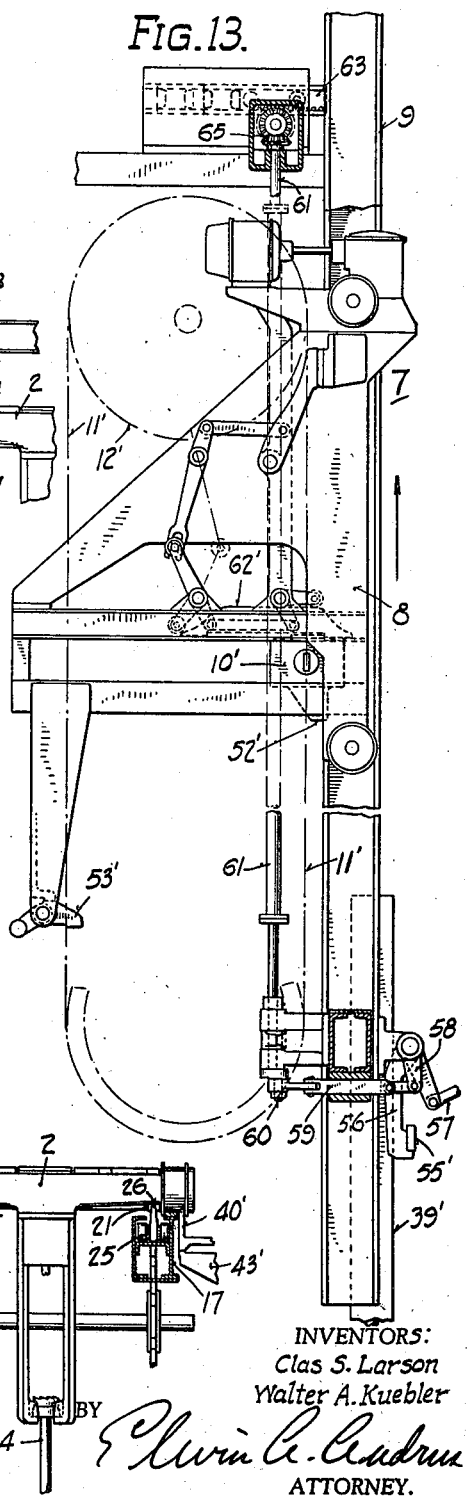
Fig. 13 is a detail view of the elevator carriage of Fig. 12 shown near the upper end of its movement.

The construction of elevator 7 is similar to that of elevator 6, except that it is designed to carry its load during upward movement instead of downward movement. This means that the chains 11' operate in the opposite direction so that the crosshead 10' may be near to the elevator shaft during carrying of the load. Figs. 12 and 13 illustrate the difference in construction, and Figs. 17 to 19 illustrate the movement of member 46'.

As the elevator approaches the bottom, a pivoted cam block 53' engages crank 51' and rotates shaft 49' in a direction effecting swinging of member 46' outwardly to make the rail 40' clear the wheel of the truck 2 as shown in Fig. 17. As rail 40' passes the truck wheel, a cam 54 engages cam lever 41' and forces the rail off from its support 43', thereby permitting the rail to pass under the flange of the wheel. The cam block 52' on crosshead 10' is then caused to engage crank 50' and effect rotation of shaft 49' in the opposite direction, pivoting members 46' back into alignment with the channels 39'. The result is that rail 40' engages the track 17 and is forced back upon the support 43' and into engagement with the truck wheel as shown in Fig. 19. The elevator then starts upwardly with its load.

In order to prevent the truck 2 from running off the short rail sections 40 or 40', the latter are preferably provided with short depressions in their upper surfaces for receiving the wheels of the trucks.

At the upper end the elevators 6 and 7 are provided with short rail sections 55 and 55', respectively. In the case of elevator 6, the rails 55 receive the truck from track 13 and support the same until the rails 40 engage the truck wheels, at which time the rails 55 are pivoted laterally to clear the truck as it moves downwardly. In the case of elevator 7, the rails 55' pivot laterally to clear the truck as the latter approaches the top of the elevator and then pivot beneath the truck wheels to receive the same from rails 40' and the truck is then run from rails 55' onto track 18.

The operation of rail sections 55 is illustrated in Fig. 7 and that of rail sections 55' is illustrated in Fig. 13. Referring to Fig. 7, the rails 55 are shown mounted on pivoted lever arms 56 with a link 57 joining the arms in a manner to effect simultaneous movement of the rails either to spread them apart to clear a truck or to bring them together beneath a truck. The pivoting of the lever arms 56 is effected by an arm 58 linked to a push rod 59 which is in turn linked to an eccentric 60 on a vertical shaft 61. The vertical shaft 61 extends to the upper end of the chain 11 where it is operated by the lateral movement of cam block 62 operated by the crosshead 10. Cam block 62 operates a rack 63 which engages a pinion 64 connected by beveled gearing 65 to the shaft 61.

The rails 55' of elevator 7 are operated by similar mechanism by the lateral movement of the cam block 62' and crosshead 10'.

The present invention provides an apparatus which will transfer a truck 2 through the furnace 3 with a minimum of working parts of the elevator exposed to the direct heat of the furnace. The hangers 37 and rods 38 are the only moving parts subjected to the direct heat of the furnace, and these may be made of special alloy to prevent their change in dimension so as to effect proper delivery of the trucks to the level of track 17, or special mechanism may be employed to compensate for changes in dimension, such as that provided in copending application Serial No. 623,178, filed July 18, 1932, by Otto E. Uecker for Compensators for hoisting apparatus and assigned to a common assignee.

The shafts 49 are disposed outside the furnace wall so as not to be affected by the heat of the furnace.

We claim:

1. An elevator for conveyer systems, comprising a carriage disposed for vertical reciprocation, a hanger depending therefrom and carrying a rail for supporting a conveyer truck, a vertical guide member for said hanger, and means to effect lateral movement of said hanger at the lower end of the elevator to release said rail from said truck.

2. An elevator for conveyer systems, comprising a carriage disposed for vertical reciprocation, a hanger depending therefrom and carrying a rail for supporting a conveyer truck, a vertical guide member for said hanger, and means operated by the movement of parts of said carriage to effect lateral movement of said hanger at the lower end of the elevator to release said rail from said truck.

3. An elevator for conveyer systems, comprising an elevator shaft, a plurality of carriages disposed for simultaneous vertical reciprocation adjacent said shaft, a hanger depending from each carriage and carrying rails for supporting the ends of a conveyer truck, vertical guide members for said hangers, auxiliary guide members pivoted at the lower ends of said vertical guide members, and means to pivot said auxiliary guide members at predetermined time cycles relative to the reciprocation of said carriages to effect clearance of said truck by said rails.

4. In an elevator for conveyer systems, an elevator shaft, a plurality of hangers disposed for vertical reciprocation adjacent said shaft, vertical guide members for said hangers, means carried by said hangers for supporting a conveyer truck, and means operated in predetermined time cycle relative to the vertical reciprocation of said hangers for moving said hangers laterally to clear said supports from said truck.

5. In an elevator for conveyer systems, a hanger disposed for vertical reciprocation, a rail on said hanger for supporting the wheel of a conveyer truck, means for reciprocating said hanger laterally to cause said rail to clear said truck upon return stroke of the elevator, and means for lowering said rail as the same passes beneath the flange of the truck wheel during the lateral movement of the hanger.

6. In an elevator for conveyer systems, a hanger disposed for vertical reciprocation, a rail on said hanger for supporting the wheel of a conveyer truck, means for reciprocating said hanger laterally to cause said rail to clear said truck upon return stroke of the elevator, means for lowering said rail as the same passes beneath the flange of the truck wheel during the lateral movement of the hanger, and means for locking said rail relative to said hanger during vertical movement of the latter.

7. In an elevator for conveyer systems, two parallel vertical channel guide members, a hanger disposed for vertical reciprocation in the space between said guide members and having rollers riding in the channels thereof, means on said hanger for supporting the article being conveyed, an auxiliary guide member at one end of said guide members disposed in alignment with the same to receive said hanger during reciprocation of the latter, and means for pivoting said auxiliary guide member laterally to move said hanger laterally during a predetermined cycle of its reciprocation.

CLAS S. LARSON.
WALTER A. KUEBLER.